United States Patent
Erhart et al.

(10) Patent No.: US 7,847,813 B2
(45) Date of Patent: Dec. 7, 2010

(54) DYNAMIC MULTIMEDIA CONTENT STREAM DELIVERY BASED ON QUALITY OF SERVICE

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1324 days.

(21) Appl. No.: 11/360,256

(22) Filed: Feb. 23, 2006

(65) Prior Publication Data

US 2006/0203976 A1    Sep. 14, 2006

Related U.S. Application Data

(60) Provisional application No. 60/660,249, filed on Mar. 10, 2005.

(51) Int. Cl.
*H04N 7/14* (2006.01)

(52) U.S. Cl. .................... 348/14.01; 379/88.01

(58) Field of Classification Search ... 348/14.01–14.08; 379/88.01
See application file for complete search history.

(56) References Cited

U.S. PATENT DOCUMENTS

| | | | |
|---|---|---|---|
| 5,737,393 A | 4/1998 | Wolf | |
| 5,915,001 A | 6/1999 | Uppaluru | |
| 6,012,089 A | 1/2000 | Hasegawa | |
| 6,487,277 B2 | 11/2002 | Beyda et al. | |
| 6,567,854 B1 | 5/2003 | Olshansky et al. | |
| 6,587,822 B2 | 7/2003 | Brown et al. | |
| 6,631,186 B1 | 10/2003 | Adams et al. | |
| 6,677,968 B1 | 1/2004 | Appelman | |
| 6,691,162 B1 | 2/2004 | Wick | |
| 6,714,793 B1 | 3/2004 | Carey et al. | |
| 6,728,357 B2 | 4/2004 | O'Neal et al. | |
| 6,735,193 B1 | 5/2004 | Bauer et al. | |
| 6,750,881 B1 | 6/2004 | Appelman | |
| 6,848,008 B1 | 1/2005 | Sevanto et al. | |
| 6,904,143 B1 | 6/2005 | Peterson et al. | |
| 6,989,856 B2 * | 1/2006 | Firestone et al. ......... | 348/14.09 |
| 7,062,709 B2 | 6/2006 | Cheung | |
| 7,142,661 B2 | 11/2006 | Erhart et al. | |
| 7,164,762 B2 | 1/2007 | Hanson et al. | |

(Continued)

FOREIGN PATENT DOCUMENTS

WO    WO2005029903    * 10/2004

OTHER PUBLICATIONS

"U.S. Appl. No. 11/188,542 Office Action", Dec. 5, 2008, Publisher: USPTO, Published in: US.

(Continued)

*Primary Examiner*—Curtis Kuntz
*Assistant Examiner*—Maria El-Zoobi
(74) *Attorney, Agent, or Firm*—DeMont & Breyer, LLC

(57) ABSTRACT

A method and apparatus are disclosed for intelligently delivering components of a multimedia content stream (e.g., audio component, video component, etc.) to a telecommunications terminal based on the quality of service (QoS) for transmissions received at the terminal. The illustrative embodiment is disclosed in the context of an interactive voice response system, but is applicable in a wide variety of other telecommunications systems and applications.

10 Claims, 9 Drawing Sheets

U.S. PATENT DOCUMENTS

| | | | |
|---|---|---|---|
| 7,284,201 | B2 | 10/2007 | Cohen-Solal |
| 7,349,700 | B1 | 3/2008 | Goldfinger |
| 7,471,776 | B2 * | 12/2008 | Vollkommer et al. .... 379/88.18 |
| 2002/0198719 | A1 | 12/2002 | Gergic et al. |
| 2003/0026409 | A1 | 2/2003 | Bushey et al. |
| 2004/0071275 | A1 | 4/2004 | Bowater et al. |
| 2004/0073643 | A1 | 4/2004 | Hayes et al. |
| 2004/0218737 | A1 | 11/2004 | Kelly |
| 2005/0038876 | A1 | 2/2005 | Chadhuri |
| 2005/0104909 | A1 | 5/2005 | Okamura et al. |
| 2005/0141694 | A1 | 6/2005 | Wengrovitz |
| 2005/0254440 | A1 * | 11/2005 | Sorrell ................. 348/14.08 |
| 2005/0276399 | A1 | 12/2005 | Thompson |
| 2006/0064729 | A1 | 3/2006 | Steading |
| 2006/0282783 | A1 | 12/2006 | Covell et al. |
| 2007/0230683 | A1 | 10/2007 | Brown et al. |
| 2008/0056456 | A1 | 3/2008 | Erhart et al. |

OTHER PUBLICATIONS

Di Fabbrizio et al., "Unifying Conversational Multimedia Interfaces for Accessing Network Services Across Communication Devices", "ICME 2000", Jul. 30, 2000, pp. 653-656, vol. 2, Publisher: IEEE International Conference on Multimedia and Expo (ICME 2000), Published in: US.

Hyam, Kristy, "CA Application No. 2537887 Office Action", Jan. 8, 2009, Publisher: CIPO, Published in: CA.

Kasthuri Mohan, "IN Application No. 413/CHE/2006 Examination Report", Nov. 25, 2008, Publisher: Government of India Patent Office, Published in: IN.

Meister, "International Patent Application No. 06251246.2 Examination Report", Mar. 19, 2008, Publisher: EPO, Published in: EP.

Di Fabbrizio G. et al, "Unifying conversational multimedia interfaces for accessing network services across communication devices", Multimedia and Expo, ICME 2000, IEEE International conference on New York, NY, USA 30 Jul. 30-Aug. 2, 2000, Piscataway, NJ, USA, vol. 2, Jul. 30, 2000, pp. 653-656, XP010513097 ISBN: 0-7803-6536-4.

Jennifer L. Beckham et al, "Towards SMIL as a Foundation for Multimodal, Multimedia applications", Eurospeech 2001, European conference on speech communication and technology, vol. 2, Sep. 7, 2001, pp. 1363-1366, XP007004600.

Morales, I., "VoiceXML, CCXML, SALT. Architectural tools for enabling speech applications", XML journal [Online] vol. 3, No. 9, 2002, XP002426773 retrieved from the internet: URL:http"//xml.sys-con.com/read/40476_p.htm> [retrieved on Mar. 26, 2007].

Auburn R J (Editor), "Voice browser call control: CCXML version 1.0—W3C working draft Jan. 11, 2005", W3C, Jan. 11, 2005, XP002397221, paragraph [7.2.2.1], paragraph [09.1], Appendix D—VoiceXML 2.0 Integration Details.

Intel Corporation, "VoiceXML Solution from VoiceGenie and Intel Delivers Open, Standards-Based Voice Services Platform" [Online] Jun. 2004, pp. 1-8, XP002397222, Retrieved from the Internet: URL:http://download.intel.com/network/csp/pdf/9127wp.pdf> [retrieved on Aug. 31, 2006].

Hewlett-Packard Company, "HP OpenCall Media Platform—Browser Runtime Environment—Installation and Configuration Guide—For OCMP Release 2.4—Second Edition" [Online} 2004, pp. 1-60, XP002397224, Retrieved from the Internet: URL:http://docs.hp.com/en/5190/Instalationand Configuration.pdf? [retrieved on Aug. 31, 2006].

Sing, Simon P., "U.S. Appl. No. 11/235,890 Office Action Jul. 10, 2009", , Publisher: USPTO, Published in: US.

Hoque, Nafiz E., "U.S. Appl. No. 11/240,092 Office Action Jun. 11, 2009", , Publisher: USPTO, Published in: US.

Cremer, Jan, "EP Application No. 06251246.2 Search Report and Written Opinion Apr. 25, 2007", , Publisher: EPO, Published in: EP.

Gauthier, Gerald, "U.S. Appl. No. 11/188,542 Office Action Mar. 2, 2009", , Publisher: USPTO, Published in: US.

Gauthier, Gerald, "U.S. Appl. No. 11/188,542 Office Action Sep. 15, 2009", , Publisher: USPTO, Published in: US.

Sing, Simon P., "U.S. Appl. No. 11/235,890 Notice of Allowance Jan. 6, 2010", , Publisher: USPTO, Published in: US.

Hoque, Nafiz E., "U.S. Appl. No. 11/240,092 Panel Decision Apr. 30, 2010", , Publisher: USPTO, Published in: US.

Hyam, Kristy, "CA Application No. 2,537,887 Office Action Jan. 27, 2010", , Publisher: CIPO, Published in: CA.

Gauthier, Gerald, "U.S. Appl. No. 11/188,542 Office Action Mar. 1, 2010", , Publisher: USPTO, Published in: US.

Houque, Nafiz E., "U.S. Appl. No. 11/240,092 Office Action Aug. 5, 2010", , Publisher: USPTO, Published in: US.

* cited by examiner

Figure 2 (PRIOR ART)

```
<?xml version="1.0"?>
<vxml version="2.0">
<menu id="menu1" scope="document" dtmf="true">
    <prompt> Welcome to XYZ Corp! Please choose one of the following options: <enumerate/> </prompt>
    <choice dtmf="1" next="#formSales">  Sales,    </choice>
    <choice dtmf="*2" next="#formMarket">  Marketing,  </choice>
    <choice dtmf="3"  next="#formSupport"> Support    </choice>
</menu>
<form id="formSales">
    <field name="SalesInput">
        <prompt>
            I will now transfer you to sales
        </prompt>
    </field>
</form>
<form id="formMarket">
    <field name="MarketInput">
        <prompt> I will now transfer you to marketing </prompt>
    </field>
</form>
<form id="formSupport">
    <field name="SupportInput">
        <prompt> I will now transfer you to support </prompt>
    </field>
</form>
</vxml>
```

Figure 4

```
<?xml version="1.0"?>
<vxml version="2.0">
<menu id="menu1" scope="document" dtmf="true">
    <prompt> Welcome to XYZ Corp! Please choose one of the following options: <enumerate/> </prompt>
    <choice dtmf="1"  next="#formSales">  Sales,     </choice>
    <choice dtmf="*2" next="#formMarket"> Marketing, </choice>
    <choice dtmf="3"  next="#formSupport"> Support   </choice>
</menu>
<form id="formSales">
<field name="SalesInput">
    <prompt>
        <video chan="video+audio" src="http://video.svr/salesIntro.3gp </video>
    </prompt>
</field>
</form>
<form id="formMarket">
    <prompt>
        <video chan="video" src="http://video.svr/marketingVideo.3gp </video>
    </prompt>
</form>
<form id="formSupport">
<field name="SupportInput">
    <prompt> I will now transfer you to support </prompt>
</field>
</form>
</vxml>
```

DYNAMIC MULTIMEDIA CONTENT STREAM DELIVERY BASED ON QUALITY OF SERVICE

CROSS-REFERENCE TO RELATED APPLICATIONS

This application claims the benefit of U.S. provisional application Ser. No. 60/660,249, filed Mar. 10, 2005, entitled "System and Method for Multimodal Content Delivery in Interactive Response Systems,", which is also incorporated by reference.

FIELD OF THE INVENTION

The present invention relates to telecommunications in general, and, more particularly, to the delivery of multimedia content streams to telecommunications terminals based on quality of service (QoS).

BACKGROUND OF THE INVENTION

Many enterprises employ an interactive voice response (IVR) system that handles calls from telecommunications terminals. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems the caller can connect to a person in the enterprise by either selecting an appropriate menu option, or by entering the telephone extension associated with that person.

FIG. 1 depicts telecommunications system 100 in accordance with the prior art. Telecommunications system 100 comprises telecommunications terminal 101, telecommunications network 105, private branch exchange (PBX) 110, and interactive voice response system 120, interconnected as shown.

Telecommunications terminal 101 is one of a telephone, a notebook computer, a personal digital assistant (PDA), etc. and is capable of placing and receiving calls via telecommunications network 105.

Telecommunications network 105 is a network such as the Public Switched Telephone Network [PSTN], the Internet, etc. that carries calls to and from telecommunications terminal 101, private branch exchange 110, and other devices not show in FIG. 1. A call might be a conventional voice telephony call, a text-based instant messaging (IM) session, a Voice over Internet Protocol (VoIP) call, etc.

Private branch exchange (PBX) 110 receives incoming calls from telecommunications network 105 and directs the calls to interactive voice response (IVR) system 120 or to one of a plurality of telecommunications terminals within the enterprise, depending on how private branch exchange 110 is programmed or configured. For example, in an enterprise call center, private branch exchange 110 might comprise logic for routing calls to service agents' terminals based on criteria such as how busy various service agents have been in a recent time interval, the telephone number called, and so forth. In addition, private branch exchange 110 might be programmed or configured so that an incoming call is initially routed to interactive voice response (IVR) system 120, and, based on caller input to IVR system 120, subsequently redirected back to PBX 110 for routing to an appropriate telecommunications terminal within the enterprise. Private branch exchange (PBX) 110 also receives outbound signals from telecommunications terminals within the enterprise and from interactive voice response (IVR) system 120, and transmits the signals on to telecommunications network 105 for delivery to a caller's terminal.

Interactive voice response (IVR) system 120 is a data-processing system that presents one or more menus to a caller and receives caller input (e.g., speech signals, keypad input, etc.), as described above, via private branch exchange 110. Interactive voice response system (IVR) 120 is typically programmable and performs its tasks by executing one or more instances of an IVR system application. An IVR system application typically comprises one or more scripts that specify what speech is generated by interactive voice response system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

A popular language for such scripts is the Voice eXtensible Markup Language (abbreviated VoiceXML or VXML). The Voice eXtensible Markup Language is an application of the eXtensible Markup Language, abbreviated XML, which enables the creation of customized tags for defining, transmitting, validating, and interpretation of data between two applications, organizations, etc. The Voice eXtensible Markup Language enables dialogs that feature synthesized speech, digitized audio, recognition of spoken and keyed input, recording of spoken input, and telephony. A primary objective of VXML is to bring the advantages of web-based development and content delivery to interactive voice response system applications.

FIG. 2 depicts an exemplary Voice eXtensible Markup Language (VXML) script (also known as a VXML document or page), in accordance with the prior art. The VXML script, when executed by interactive voice response system 120, presents a menu with three options; the first option is for transferring the call to the sales department, the second option is for transferring the call to the marketing department, and the third option is for transferring the call to the customer support department. Audio content (in particular, synthesized speech) that corresponds to text between the <prompt> and </prompt> tags is generated by interactive voice response system 120 and transmitted to the caller.

SUMMARY OF THE INVENTION

As video displays become ubiquitous in telecommunications terminals, it can be advantageous for interactive voice response (IVR) systems to transmit multimedia content streams that comprise both video and audio. The illustrative embodiment of the present invention enables an IVR system to intelligently deliver multimedia content streams (i.e., content streams that comprise two or more components that have different media types) via the addition of extensions to the Voice eXtensible Markup Language (VXML) standard. In accordance with the illustrative embodiment, a telecommunications terminal periodically informs an interactive voice response (IVR) system of the quality of service (QoS) for transmissions received at the terminal. As is well-known in the art, quality of service is a function of bandwidth, latency, and error rate.

When an IVR system script specifies a multimedia content stream to be delivered to the terminal, the IVR system determines which components of the multimedia content stream can be delivered while maintaining quality of service (QoS) above a minimum acceptable threshold. For example, suppose an IVR system script has a command to deliver a multimedia content stream to a terminal, where the content stream consists of two components: a first component whose media type is audio, and a second component whose media type is video. When the interactive voice response system executes the command, the IVR system will deliver:

both the audio and video components when the additional transmission loads of the two components would not degrade quality of service (QoS) below an acceptable level;

the video component, but not the audio component, when
(i) the transmission loads of both components would degrade QoS too severely, and
(ii) the transmission load of the video component by itself would not degrade QoS too severely;

the audio component, but not the video component, when
(i) the transmission load of the video component by itself would degrade QoS too severely, and
(ii) the transmission load of the audio component by itself would not degrade QoS too severely; and neither component when the transmission load of the audio component by itself would degrade QoS too severely.

In accordance with the illustrative embodiment, at the beginning of a call, a telecommunications terminal notifies the interactive voice response system of the quality of service (QoS) for transmissions received at the terminal, and if necessary, updates this information during the call. If a script of the interactive voice response system contains a command to deliver a multimedia content stream to the telecommunications terminal, the interactive voice response system delivers only those components of the multimedia content stream that will not degrade the quality of service below a minimum acceptable threshold.

If, while one or more components of a multimedia content stream are delivered to a terminal, the interactive voice response system is informed that the quality of service (QoS) at the terminal has fallen below a particular threshold, then the interactive voice response system suspends transmission of at least one of the components, and optionally, might transmit one or more other components in lieu of the suspended component(s). For example, if both video and audio components are delivered to a terminal, the video component might be suspended when the quality of service (QoS) falls below a particular threshold. As another example, if an interactive voice response system is delivering only the video component of a multimedia content stream to a terminal and the quality of service (QoS) drops below a particular threshold, then the IVR system might suspend the video component and transmit the audio component of the stream instead.

Similarly, if the quality of service (QoS) improves sufficiently during the transmission of one or more components of a multimedia stream, then the interactive voice response system might begin transmitting one or more suspended components of the multimedia stream, either in addition to the components that are currently being delivered, or instead of one or more components that are currently being delivered. For example, if an interactive voice response system is delivering only the audio component of a multimedia content stream to a terminal and the quality of service (QoS) rises above a particular threshold, then the IVR system might begin transmitting the video component of the multimedia content stream instead of the audio component, while if QoS rises above an even higher threshold, then the IVR system might begin transmitting the video component in addition to the audio component.

The illustrative embodiment comprises: transmitting a first component and a second component of a multimedia stream to a telecommunications terminal when the quality of service for one or more signals received at said telecommunications terminal is above a threshold; and otherwise, transmitting said first component but not said second component to said telecommunications terminal.

BRIEF DESCRIPTION OF THE DRAWINGS

FIG. 2 depicts an exemplary Voice eXtensible Markup Language (VXML) script, in accordance with the prior art.

FIG. 4 depicts an exemplary Voice eXtensible Markup Language (VXML) script, in accordance with the illustrative embodiment of the present invention.

DETAILED DESCRIPTION

The terms appearing below are given the following definitions for use in this Description and the appended Claims.

For the purposes of the specification and claims, the term "call" is defined as an interactive communication involving one or more telecommunications terminal users. A call might be a traditional voice telephone call, an instant messaging (IM) session, a video conference, etc.

Figure 1:
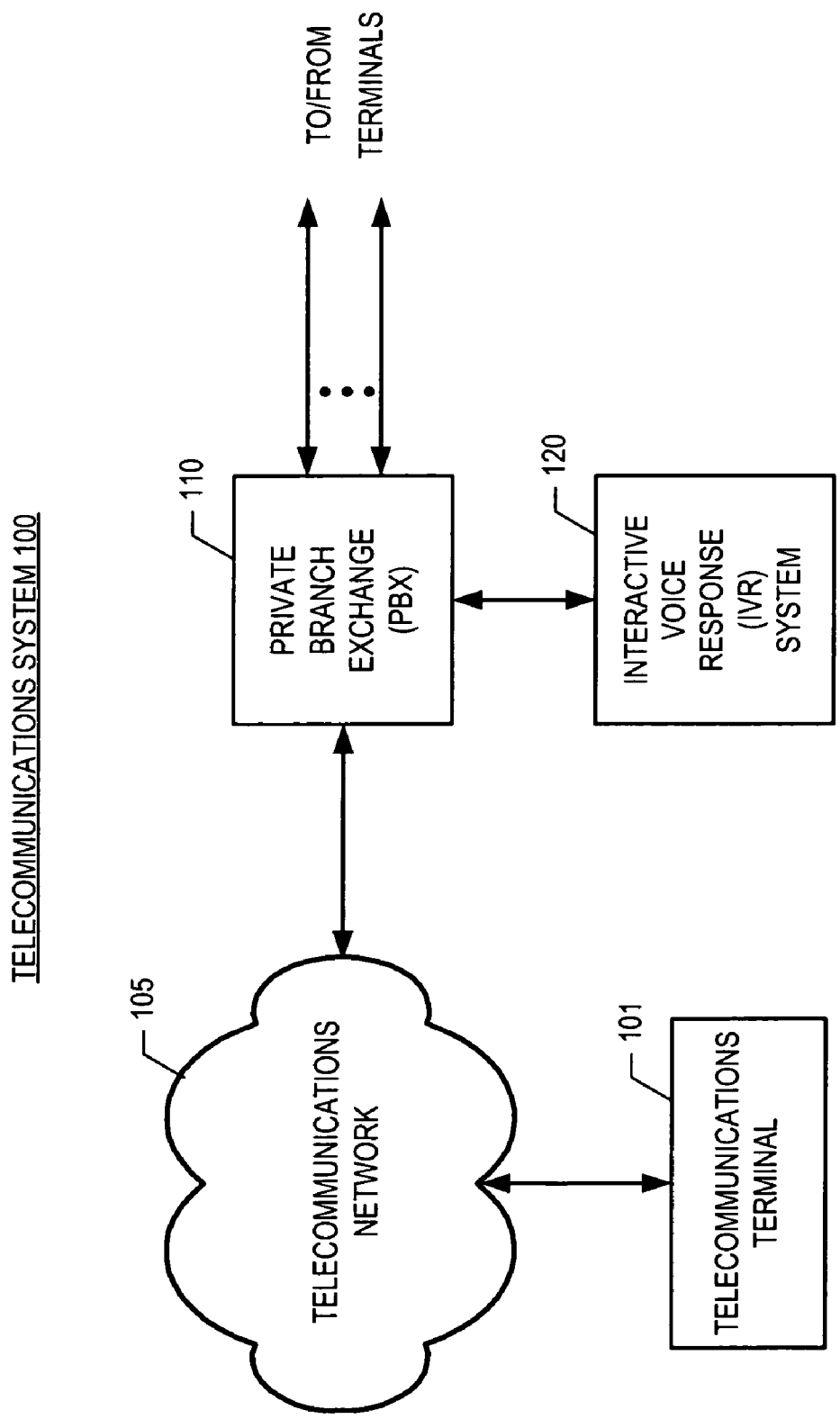
FIG. 1 depicts telecommunications system 100 in accordance with the prior art.
Figure 3:
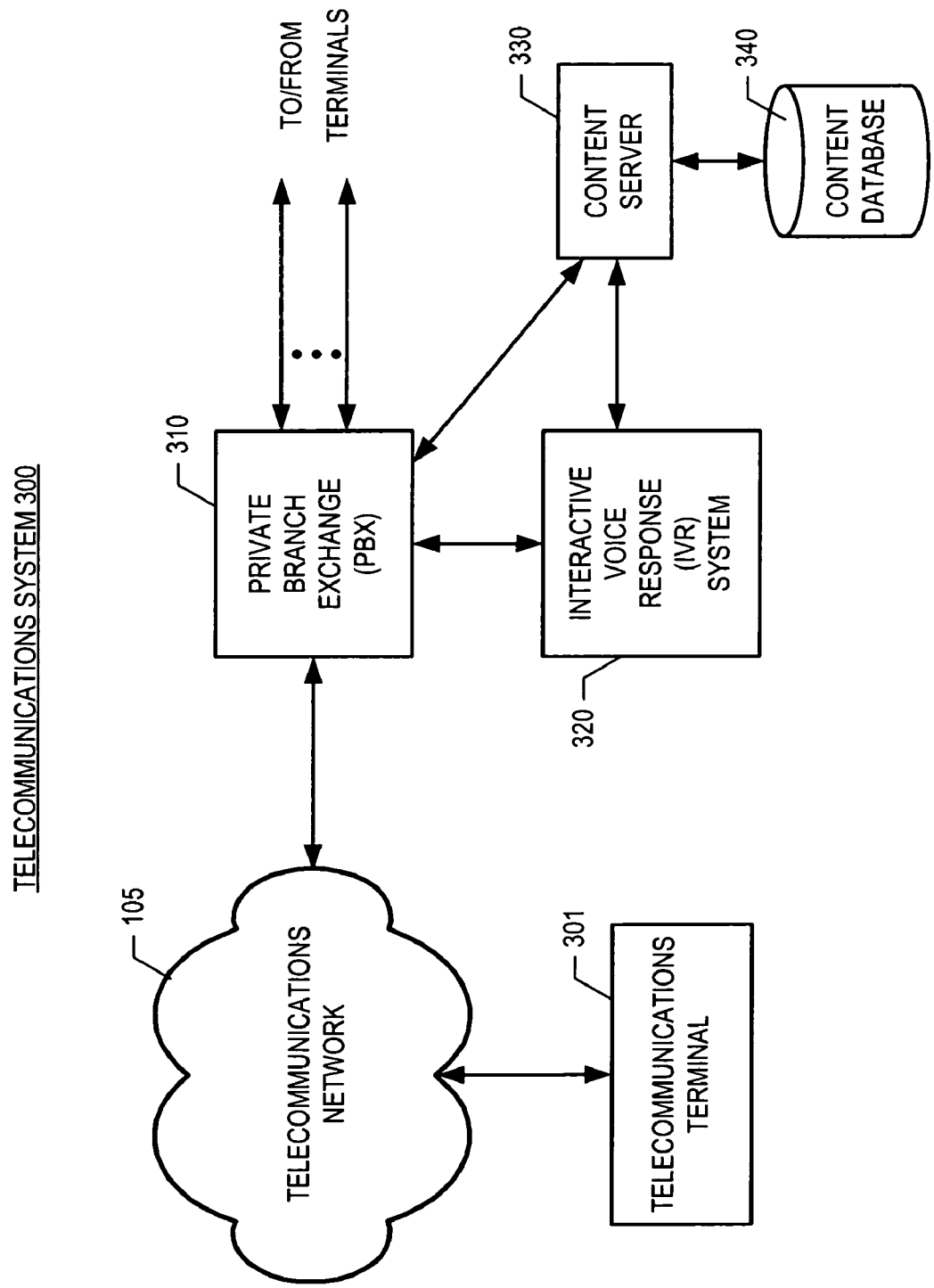
FIG. 3 depicts telecommunications system 300 in accordance with the illustrative embodiment of the present invention.

FIG. 3 depicts telecommunications system 300 in accordance with the illustrative embodiment of the present invention. Telecommunications system 300 comprises telecommunications terminal 301, telecommunications network 105, private branch exchange (PBX) 310, interactive voice response system 320, content server 330, and content database 340, interconnected as shown.

Telecommunications terminal 301 is one of a telephone, a notebook computer, a personal digital assistant (PDA), etc. and is capable of placing and receiving calls via telecommunications network 305. Telecommunications terminal 301 also has one or more transducers (e.g., a speaker, a video display, etc.) for outputting signals that are received via telecommunications network 105, in well-known fashion. In addition, telecommunications terminal 301 is capable of performing the tasks of FIG. 9, described below.

Private branch exchange (PBX) 310 provides all the functionality of private branch exchange (PBX) 110 of the prior art, and is also capable of receiving streamed content (e.g., audio, video, multimedia, etc.) from content server 330, of forwarding streamed content on to telecommunications network 105 for delivery to a caller's terminal, and of transmitting signals related to streamed content to content server 330. Furthermore, in addition to conventional telephony-based signaling and voice signals, private branch exchange 310 is also capable of transmitting and receiving Internet Protocol (IP) data packets, Session Initiation Protocol (SIP) messages, Voice over IP (VoIP) traffic, and stream-related messages (e.g., Real Time Streaming Protocol [RTSP] messages, etc.) to and from IVR system 320. It will be clear to those skilled in the art, after reading this specification, how to make and use private branch exchange (PBX) 310.

Interactive voice response system 320 provides all the functionality of interactive voice response system 120 of the prior art, and is also capable of transmitting commands to content server 330 (e.g., starting playback of a content stream, stopping playback of the content stream, queueing another content stream, etc.) and of receiving information from content server 330 (e.g., an indication that playback of a content stream has begun, an indication that playback of a content stream has completed, etc.). In addition, interactive voice response system 320 is capable of performing the tasks of FIGS. 5 through 8, described below. It will be clear to those skilled in the art, after reading this specification, how to make and use interactive voice response system 320.

Content server 330 is capable of retrieving content from content database 340, of buffering and delivering a content stream to a calling terminal via private branch exchange 310, of receiving commands from interactive voice response system 320 (e.g., to start playback of a content stream, to queue another content stream, etc.), of transmitting status information to interactive voice response system 320, and of generating content (e.g., dynamically generating a video of rendered text, etc.) in well-known fashion. It will be clear to those skilled in the art, after reading this specification, how to make and use content server 330.

Content database 340 is capable of storing a plurality of multimedia content (e.g., video content, audio content, etc.) and of retrieving content in response to commands from content server 330, in well-known fashion. It will be clear to those skilled in the art, after reading this specification, how to make and use content database 340.

As will be appreciated by those skilled in the art, some embodiments of the present invention might employ an architecture for telecommunications system 300 that is different than that of the illustrative embodiment (e.g., interactive voice response system 320 and content server 330 might reside on a common server, etc.). It will be clear to those skilled in the art, after reading this specification, how to make and use such alternative architectures.

FIG. 4 depicts an exemplary Voice Extensible Markup Language (VXML) script, in accordance with the illustrative embodiment of the present invention. The script is a modified version of the script of FIG. 2 of the prior art, with changes indicated in boldface. As shown in FIG. 4, the script now contains: a prompt for a multimedia content stream salesIntro.3gp that comprises audio and video components; a prompt for a video-only content stream marketingVideo.3gp; and a speech (i.e., audio only) prompt, as in the script of FIG. 2.

In accordance with the script of FIG. 4 of the illustrative embodiment, when a user selects choice 1 (sales), interactive voice response system 320 delivers one, both, or neither of the audio and video components of multimedia content stream salesIntro.3gp, based on the transmission loads of the two components and the current quality of service (QoS) for transmissions received at telecommunications terminal 301. In particular, interactive voice response system 320 delivers:

both the audio and video components when the additional transmission loads of the two components would not degrade quality of service (QoS) below an acceptable level;

the video component, but not the audio component, when
(i) the transmission loads of both components would degrade QoS too severely, and
(ii) the transmission load of the video component by itself would not degrade QoS too severely;

the audio component, but not the video component, when
(i) the transmission load of the video component by itself would degrade QoS too severely, and
(ii) the transmission load of the audio component by itself would not degrade QoS too severely; and neither component when the transmission load of the audio component by itself would degrade QoS too severely.

The particular tasks that are performed by interactive voice response system 320 in order to deliver multimedia content streams such as salesIntro.3gp in this manner are described below and with respect to FIGS. 5 through 8. As will be appreciated by those skilled in the art, the selection of particular threshold values, as well as the determination of what constitutes an "acceptable" level of quality of service, might be based on a variety of factors such as: one or more properties of telecommunications network 105, traffic patterns, one or more properties of telecommunications terminal 301, and so forth.

Figure 5:
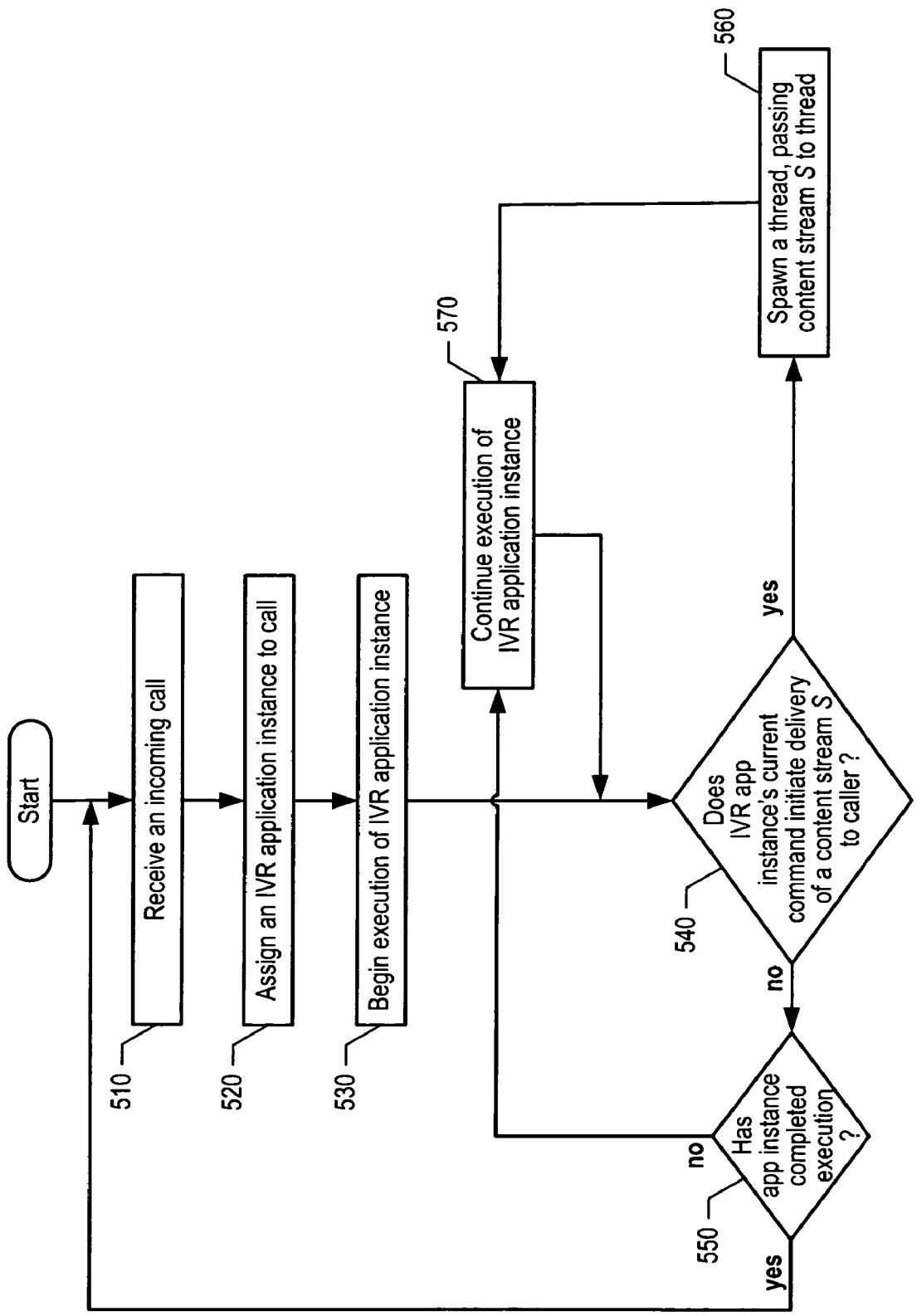
FIG. 5 depicts a flowchart of the salient tasks of interactive voice response system 320, as shown in FIG. 3, in accordance with the illustrative embodiment of the present invention.

FIG. 5 depicts a flowchart of the salient tasks of interactive voice response system 320, in accordance with the illustrative embodiment of the present invention. It will be clear to those skilled in the art which tasks depicted in FIG. 5 can be performed simultaneously or in a different order than that depicted.

At task 510, an incoming call is received at interactive voice response system 320, in well-known fashion.

At task 520, interactive voice response system 320 assigns an instance of an appropriate IVR system application to the incoming call, in well-known fashion. As will be appreciated by those skilled in the art, although in the illustrative embodiment an instance of an IVR system application handles one incoming call at a time, in some other embodiments of the present invention an application instance might handle a plurality of calls concurrently.

At task 530, interactive voice response system 320 begins executing the IVR application instance, in well-known fashion.

At task 540, interactive voice response system 320 checks whether the current command to be executed in the IVR application instance initiates delivery of a content stream S to the calling telecommunications terminal (e.g., telecommunications terminal 301, etc.). If so, execution continues at task 560, otherwise, execution proceeds to task 550.

At task 550, interactive voice response system 320 checks whether execution of the IVR application instance has completed. If so, execution continues back at task 510 for the next incoming call; otherwise, execution proceeds to task 570.

At task 560, interactive voice response system 320 spawns a thread that is responsible for starting and stopping the delivery of content streams to the calling terminal during the call. Content stream S is passed to the thread, in well-known fashion (e.g., via a memory pointer, via an operating system inter-thread communication mechanism, etc.). The operation of this thread is described in detail below and with respect to FIGS. 6 through 8.

At task 570, interactive voice response system 320 continues the execution of the IVR application instance, in well-known fashion. After task 570, execution continues back at task 540.

Figure 6:
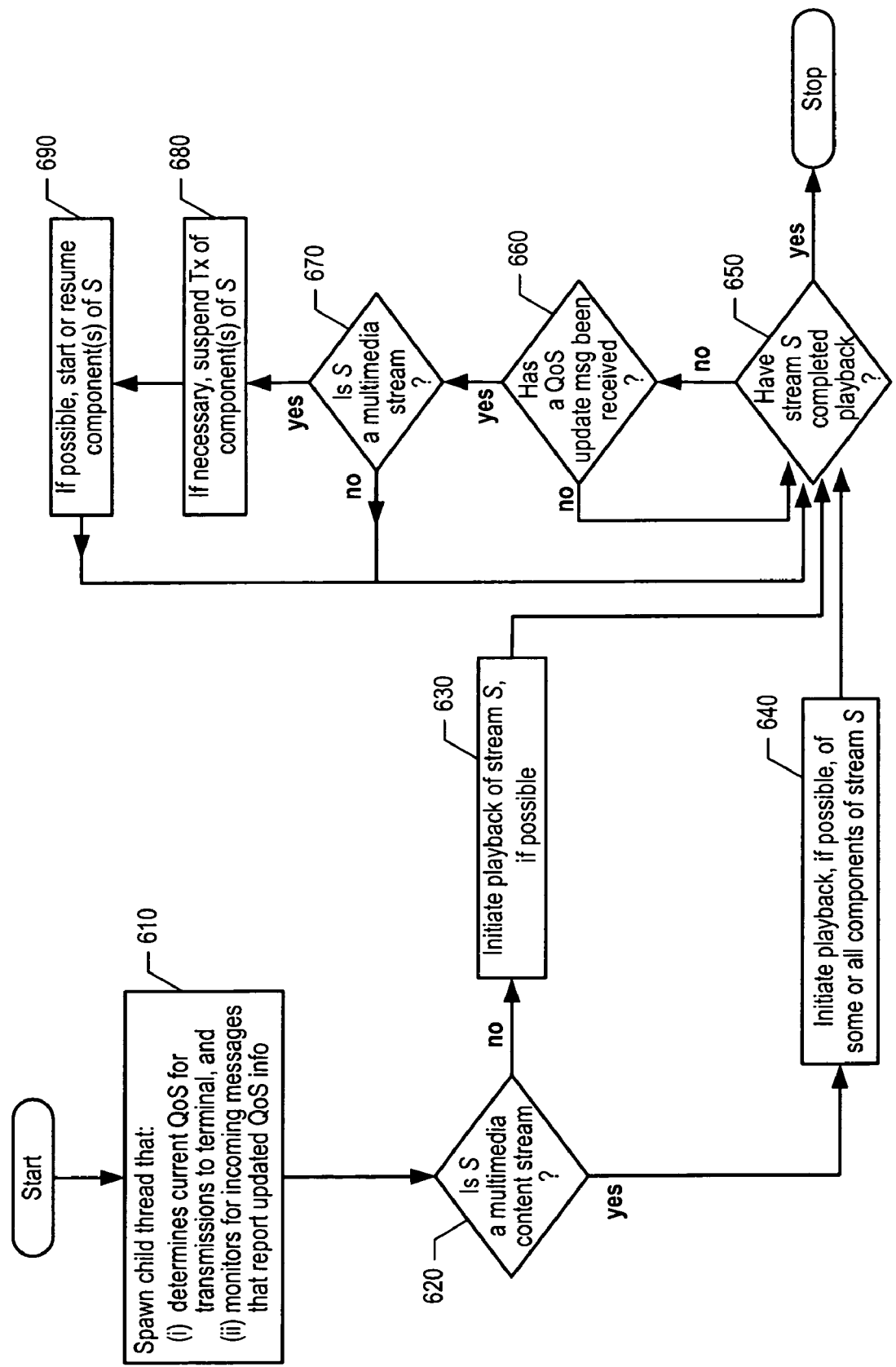
FIG. 6 depicts a flowchart of the salient tasks of a thread that is spawned at task 560 of FIG. 5, in accordance with the illustrative embodiment of the present invention.

FIG. 6 depicts a flowchart of the salient tasks of the thread spawned at task 560, in accordance with the illustrative embodiment of the present invention. It will be clear to those skilled in the art which tasks depicted in FIG. 6 can be performed simultaneously or in a different order than that depicted.

At task 610, the thread spawns a child thread that: (i) determines the current quality of service for transmissions to the calling terminal, and (ii) monitors during the call for incoming messages that report updated QoS information. The child thread performs subtask (i) once at startup, and performs subtask (ii) continually during the call. The child thread dies when the (parent) thread dies (i.e., after the determination of task 670, described below, is affirmative).

At task 620, the thread checks whether content stream S is a multimedia stream (i.e., whether S contains two or more components that have different media types). If so, execution proceeds to task 640, otherwise execution continues at task 630.

At task 630, the thread initiates playback of content stream S if the transmission of content stream S will not degrade too severely the quality of service at the calling terminal (which might be receiving other, already-initiated content streams). Task 630 is described in detail below and with respect to FIG. 7.

At task 640, the thread delivers as many of the components of multimedia content stream S as possible, as described in detail below and with respect to FIG. 8.

At task 650, the thread checks whether playback of content stream S has completed. If so, the thread and its child (spawned at task 610) die, otherwise execution continues at task 665.

At task 660, the thread checks whether a message that reports updated quality of service (QoS) information has been received. If not, execution continues back at task 650, otherwise execution proceeds to task 670.

At task 670, the thread checks whether S is a multimedia content stream. If so, execution proceeds to task 680, otherwise execution continues back at task 650.

At task 680, the thread suspends, if necessary, one or more of the components of S that are being delivered to the calling terminal, based on the updated QoS information.

At task 690, the thread, if possible, resumes transmission of one or more suspended components of S, or initiates transmission of one or more components of S, or both, based on the updated QoS information. After task 690, execution of the thread continues back at task 650.

As will be appreciated by those skilled in the art, it is possible that in a given iteration of the loop of FIG. 6, task 680 suspends transmission of a first component of S and task 690 starts/resumes transmission of a second component of S, thereby effectively "switching" from the first component to the second component during the call.

Figure 7:
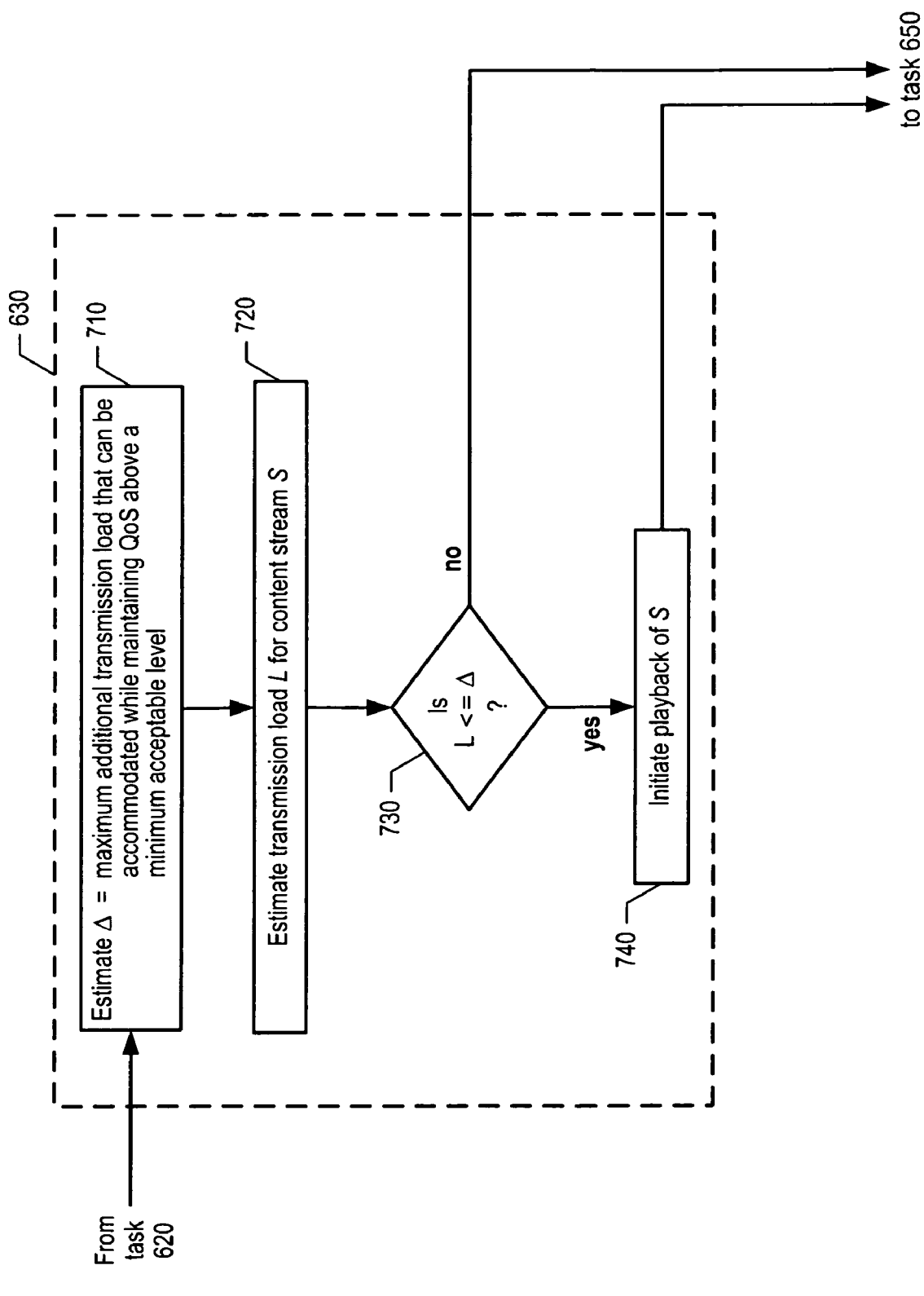
FIG. 7 depicts a detailed flowchart of task 630, as shown in FIG. 6, in accordance with the illustrative embodiment of the present invention.

FIG. 7 depicts a detailed flowchart of task 630, in accordance with the illustrative embodiment of the present invention. It will be clear to those skilled in the art which subtasks depicted in FIG. 7 can be performed simultaneously or in a different order than that depicted.

At subtask 710, the thread estimates, based on the current QoS (monitored by the child thread spawned at task 610), the maximum additional transmission load Δ that can be accommodated while maintaining QoS above a minimum acceptable level. As will be appreciated by those skilled in the art, a variety of admission control techniques that are known in the art can be employed for estimating the value of Δ.

At subtask 720, the thread estimates the transmission load L for content stream S, in well-known fashion (e.g., based on properties of S such as minimum bandwidth requirements, maximum jitter tolerance, etc.).

At subtask 730, the thread checks whether the transmission load for content stream S is less than or equal to Δ. If so, execution proceeds to task 740, otherwise execution continues at task 650 of FIG. 6

At subtask 740, the thread initiates playback of content stream S, in well-known fashion. After subtask 740, execution continues at task 650 of FIG. 6.

Figure 8:
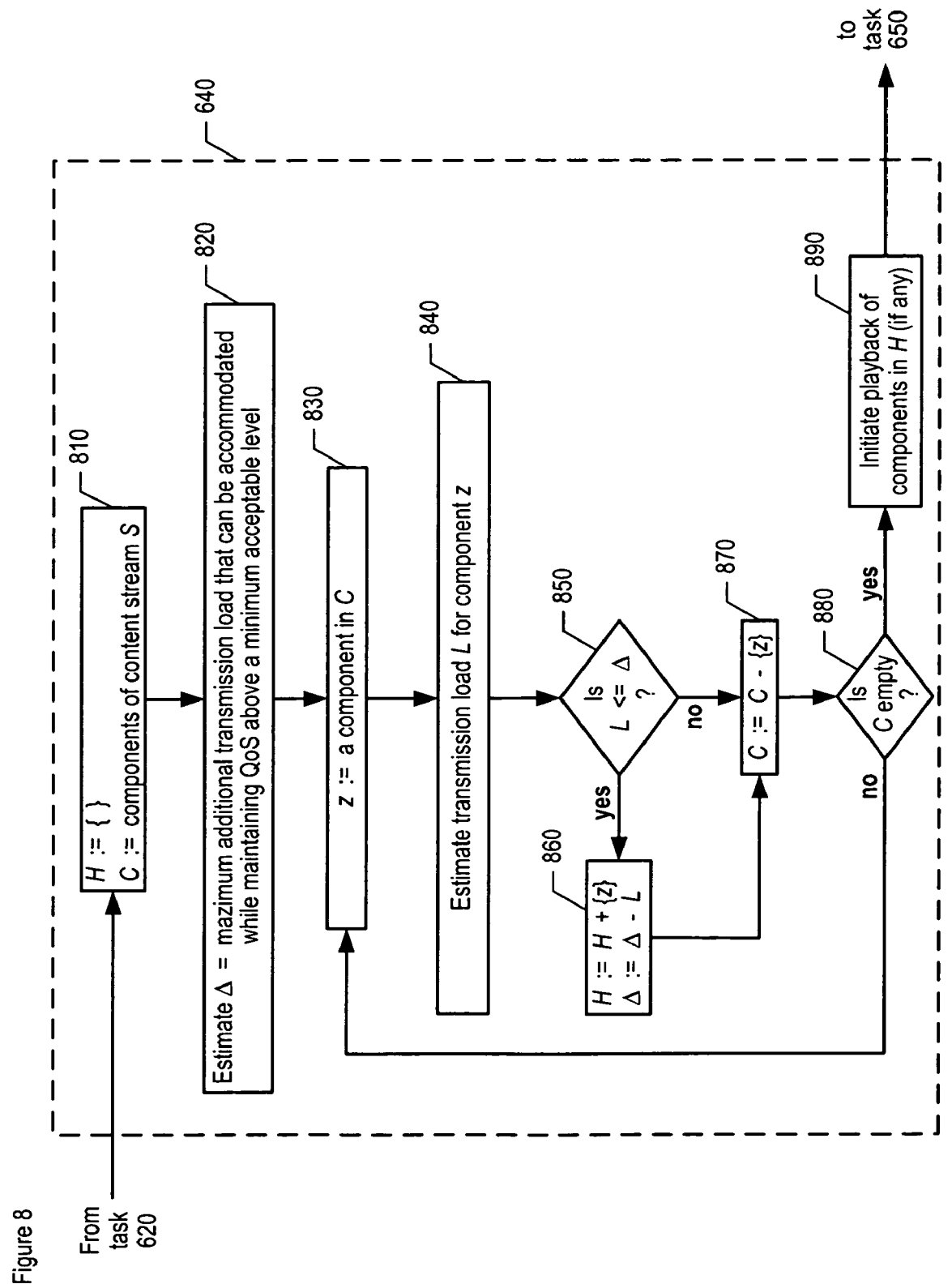
FIG. 8 depicts a detailed flowchart of task 640, as shown in FIG. 6, in accordance with the illustrative embodiment of the present invention.

FIG. 8 depicts a detailed flowchart of task 640, in accordance with the illustrative embodiment of the present invention. It will be clear to those skilled in the art which subtasks depicted in FIG. 8 can be performed simultaneously or in a different order than that depicted.

At subtask 810, the thread initializes variable H to the empty set, and variable C to the set of components of multimedia content stream S.

At subtask 820, the thread estimates the maximum additional transmission load Δ that can be accommodated while maintaining QoS above a minimum acceptable level, as in subtask 710.

At subtask 830, the thread sets variable z to one of the components of set C.

At subtask 840, the thread estimates the transmission load L for component z, as in subtask 720.

At subtask 850, the thread checks whether load L is less than or equal to Δ. If so, execution continues at subtask 860, otherwise execution continues at subtask 870.

At subtask 860, the thread adds component z to set H, and subtracts L from Δ.

At subtask 870, component z is removed from set C.

At subtask 880, the thread checks whether C is empty. If so, execution continues at subtask 890, otherwise execution continues back at subtask 830.

At subtask 890, the thread initiates playback of the components in H, if H is non-empty. After subtask 890, execution continues at task 650 of FIG. 6.

As will be appreciated by those skilled in the art, the method of FIG. 8 is a greedy heuristic for obtaining a good, but not necessarily optimal, utilization of available bandwidth. The problem of obtaining an optimal utilization is analogous to the NP-complete bin packing problem, and therefore there is no known polynomial-time algorithm for determining an optimal utilization. It might be desirable in some embodiments of the present invention, however, to test all possible component combinations and determine the optimal combination, particularly when a content stream has a small number of components. Alternatively, when using the greedy heuristic of FIG. 8, it might be desirable in some embodiments of the present invention to enforce a particular ordering of media types (e.g., video first, audio second, etc.).

Figure 9:
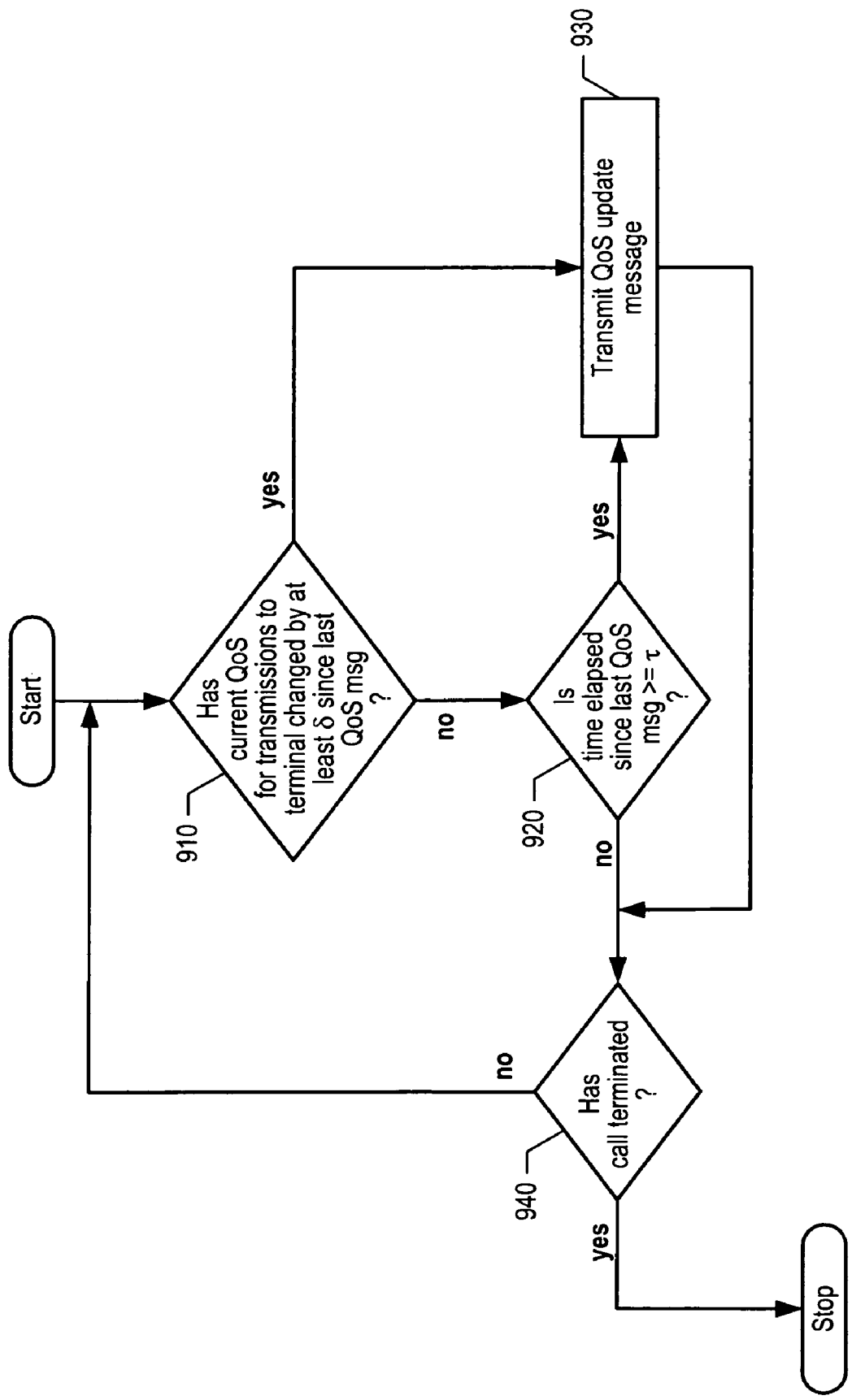
FIG. 9 depicts a flowchart of the salient tasks of telecommunications terminal 301, as shown in FIG. 3, during a call with interactive voice response system 320, in accordance with the illustrative embodiment of the present invention.

FIG. 9 depicts a flowchart of the salient tasks of telecommunications terminal 301 during a call with interactive voice response system 320, in accordance with the illustrative embodiment of the present invention.

At task 910, telecommunications terminal 301 checks whether the current quality of service for transmissions received at the terminal has changed by at least a minimum quantity δ since transmitting the last QoS message (at task 930, below). If so, execution proceeds to task 930, otherwise execution continues at task 920.

At task 920, telecommunications terminal 301 checks whether at least τ time units have elapsed since the last QoS message was transmitted by the terminal. If so, execution proceeds to task 930, otherwise execution continues at task 940.

At task 930, telecommunications terminal 301 transmits a message to interactive voice response system 320 that indicates the current quality of service (QoS) for transmissions received at the terminal. In the illustrative embodiment, this message is transmitted in accordance with the Session Initiation Protocol (SIP); it will be clear to those skilled in the art how to send the QoS information via some other protocol or signal.

At task 940, telecommunications terminal 301 checks whether the call has terminated. If so, the method of FIG. 9 terminates, otherwise execution continues back at task 910.

As will be appreciated by those skilled in the art, in some embodiments of the present invention it might be advantageous for telecommunications network 105 to be aware of changes in QoS at telecommunications terminal 301 when the terminal is not involved in a call with interactive voice response system 320 (e.g., during a call with another terminal, between calls, etc.) Such embodiments could enable other applications of telecommunications network 105 that are independent of interactive voice response system 320 to make use of this information. As will be appreciated by those skilled in the art, in such embodiments the method of FIG. 9 should be modified so that it executes at times other than just during calls with interactive voice response system 320. As will be further appreciated by those skilled in the art, in such embodiments one or more terminals or elements of telecommunications network 105's infrastructure (e.g., a switch, etc.) might be reprogrammed to monitor and receive messages that are transmitted by terminal 301 in accordance with the method of FIG. 9, as is done by the child thread spawned at task 610 at interactive voice response system 320.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving a call from a telecommunications terminal at an interactive voice response system;
spawning a thread at said interactive voice response system after the receiving of said call, wherein said thread is for starting and stopping delivery of a multimedia stream to said telecommunications terminal, and wherein said multimedia stream comprises a plurality of components;
determining via said thread a non-empty subset of said plurality of components based on the quality of service for one or more signals received at said telecommunications terminal; and
transmitting only said non-empty subset of said plurality of components to said telecommunications terminal.

2. The method of claim 1 wherein a first of said plurality of components is audio and a second of said plurality of components is video.

3. The method of claim 1 wherein a first of said plurality of components is video and a second of said plurality of components is audio.

4. A method comprising:
receiving a call from a telecommunications terminal at an interactive voice response system;
spawning a thread at said interactive voice response system after the receiving of said call, wherein said thread is for starting and stopping delivery of a multimedia stream to said telecommunications terminal, and wherein said multimedia stream comprises a plurality of components;
determining via said thread a non-empty subset of said plurality of components based on the quality of service for one or more signals received at said telecommunications terminal, wherein said non-empty subset comprises at least two of said plurality of components;
transmitting only said non-empty subset of said plurality of components to said telecommunications terminal; and
when the quality of service for one or more signals received at said telecommunications terminal falls below a threshold, suspending the transmission of one of said non-empty subset of components while continuing to transmit the remaining components of said non-empty subset of components.

5. The method of claim 4 further comprising resuming the transmission of said one of said non-empty subset of components when the quality of service for said one or more signals rises back above said threshold.

6. A method comprising:
receiving a call from a telecommunications terminal at an interactive voice response system;
spawning a thread at said interactive voice response system after the receiving of said call, wherein said thread is for starting and stopping delivery of a multimedia stream to said telecommunications terminal, and wherein said multimedia stream comprises a plurality of components;
determining via said thread a non-empty subset of said plurality of components based on the quality of service for one or more signals received at said telecommunications terminal, wherein said non-empty subset comprises at least two of said plurality of components;
transmitting only said non-empty subset of said plurality of components to said telecommunications terminal; and
when the quality of service for one or more signals received at said telecommunications terminal rises above a threshold, transmitting one of said plurality of components that is not a member of said non-empty subset of components in addition to said non-empty subset of components.

7. The method of claim 6 wherein said one of said plurality of components that is not a member of said non-empty subset of components is video.

8. A method comprising:
- receiving a call from a telecommunications terminal at an interactive voice response system;
- spawning a thread at said interactive voice response system after the receiving of said call, wherein said thread is for starting and stopping delivery of a multimedia stream to said telecommunications terminal, and wherein said multimedia stream comprises a plurality of components;
- determining via said thread a non-empty subset of said plurality of components based on the quality of service for one or more signals received at said telecommunications terminal, wherein said non-empty subset comprises at least two of said plurality of components;
- transmitting only said non-empty subset of said plurality of components to said telecommunications terminal; and
- when the quality of service for one or more signals received at said telecommunications terminal drops below a threshold, transmitting one of said plurality of components that is not a member of said non-empty subset of components in lieu of one of said non-empty subset of components.

9. The method of claim 8 wherein the transmission of said one of said non-empty subset of components requires greater utilization of a resource than the transmission of said one of said plurality of components that is not a member of said non-empty subset of components.

10. The method of claim 8 further comprising:
- when the quality of service for said one or more signals rises back above said threshold,
  - (i) suspending the transmission of said one of said plurality of components that is not a member of said non-empty subset of components, and
  - (ii) resuming the transmission of said one of said non-empty subset of components.

* * * * *